United States Patent [19]

Asao et al.

[11] Patent Number: 5,301,923
[45] Date of Patent: Apr. 12, 1994

[54] GREASE-SEALED ROLLING CONTACT BEARING

[75] Inventors: Mitsunari Asao, Suzuki; Osamu Hirano; Hidenobu Mikami, both of Kuwana, all of Japan

[73] Assignee: NTN Corporation, Osaka, Japan

[21] Appl. No.: 6,796

[22] Filed: Jan. 21, 1993

[30] Foreign Application Priority Data

Jan. 22, 1992 [JP] Japan .................. 4-9329
Jun. 30, 1992 [JP] Japan .................. 4-173093

[51] Int. Cl.$^5$ ............................ C10M 115/08
[52] U.S. Cl. ................. 252/12.002; 252/33.004; 252/51.005 A; 252/51.005 R
[58] Field of Search .............. 252/12, 12.2, 51.5 A, 252/51.5 R, 33.4

[56] References Cited

U.S. PATENT DOCUMENTS

| | | | |
|---|---|---|---|
| 4,915,860 | 4/1990 | Kinoshita et al. | 252/51.5 R |
| 5,011,617 | 4/1991 | Fagan | 252/51.5 R |
| 5,043,085 | 8/1991 | Kinoshita et al. | 252/51.5 R |
| 5,059,336 | 10/1991 | Naka et al. | 252/51.5 A |
| 5,145,591 | 9/1992 | Kinoshita et al. | 252/51.5 R |

*Primary Examiner*—Jacqueline V. Howard
*Attorney, Agent, or Firm*—Nikaido, Marmelstein, Murray & Oram

[57] ABSTRACT

A grease composition sealed in a rolling contact bearing contains a base oil in the form of a mixture of an alkyldiphenylether oil and a poly-α-olefin oil. The weight ratio of the former to the latter is between 20:80 and 80:20. 5-40% by weight of thickening agent which is at least one of an aromatic diurea compound and an aromatic urea-urethane compound is added to the base oil. Further, a passivation oxidizing agent and an organic sulfonate are added.

1 Claim, 2 Drawing Sheets

GREASE-SEALED ROLLING CONTACT BEARING

This invention relates to a grease-sealed rolling contact bearing used to support the rotary shaft of electric parts and auxiliary parts of a car such as alternators, electromagnetic clutches and idler pulleys.

A demand for compact, lightweight and quiet cars is increasing these days. To meet this demand, electric parts and other auxiliary parts of a car have to be compact in size and lightweight. Also, the engine room has to be sealed sufficiently. On the other hand, such devices are required to have a high power and a high efficiency. In case of e.g. an alternator, it is a general trend to use a compact size and operate it at higher speed to make up for the decrease in output resulting from compact size.

FIG. 1 shows a pulley 1 of an automotive alternator designed for high-speed operation. A rolling contact bearing 2 supporting the pulley 1 is a grease-sealed type having grease sealed in the bearing to ensure lubrication in high-speed operation.

In this arrangement, in order to make up for any decrease in transmission efficiency resulting from the use of a smaller pulley 1, a plurality of grooves 3 for engaging a power transmission belt are formed on the pulley 1 and the belt tension is maintained rather high. The bearing 2 used near the engine is thus rotated at high speed at high temperatures and is subjected to a large load.

It is known that the life of such a bearing for use in alternators, which uses a conventional grease, tends to be shortened as the result that flaking develops on its rolling surface due to high-speed, high-load operation. Such flaking, which shortens the life of a bearing, is a peculiar destructive phenomenon which develops abruptly deep inside the bearing material, unlike ordinary flaking that occurs on rolling surfaces or in surface layers due to metal fatigue. If a bearing suffers such flaking, its life tends to become shorter than the calculated life of an ordinary grease-sealed bearing.

The present invention have found out that such flaking occurs in the following mechanism: namely, the bearing vibrates due to high-speed operation; the vibration causes wear of the rolling surface into a mirror surface; this produces a new surface, which acts as a catalyst and decomposes the grease, thus producing hydrogen; the hydrogen penetrates into the steel of the bearing, thus causing embrittlement of the steel (hereinafter referred to as hydrogen embrittlement phenomenon). This causes flaking. In order to prevent such flaking, the present inventors have proposed to apply inactivating treatment such as blackening treatment to the steel surface (Japanese Unexamined Patent Publication 2-190615).

As another solution to this problem, the present inventors have also disclosed (in Unexamined Patent Publication 3-250094) a grease containing phenylether as a base oil, which has a high bond strength with respect to hydrogen.

But, the grease containing phenylether oil as a base oil is not so good in viscosity temperature properties to be supplied in sufficient amounts onto the rolling surface of a bearing. Thus, a bearing having such a grease sealed therein is likely to get seized if it is operated at high speed under high load, especially depending on the distance between the end face of the bearing cage and the seal.

Also, it was difficult to prevent hydrogen embrittlement with the above-described grease containing a phenylether as a base oil. Further, since a rolling bearing for an electric parts and auxiliary parts of a car is used under various different conditions, it is required to have high resistance to rust so that it is kept rust-free even if it is exposed to muddy water or the like.

It is an object of this invention to provide a grease-sealed rolling contact bearing which is free of hydrogen embrittlement even under high-speed high-load operating conditions and thus is durable and which has high resistance to rust.

According to the present invention, there is provided a grease-sealed rolling contact bearing having sealed therein a grease composition comprising a base oil which is a mixture of an alkyldiphenylether oil and a poly-α-olefin oil in the weight ratio of between 20:80 and 80:20, 5–40% by weight of a thickening agent which is at least one of an aromatic diurea compound and an aromatic urea-urethane compound, a passivation oxidizing agent and an organic sulfonate.

Alkyldiphenylether oils used in the present invention are obtained by reaction of 1 mol of a diphenylether and 1–3 mols of an α-olefin whose carbon number is 10–22. A typical alkyldiphenylether oil is shown by the formula:

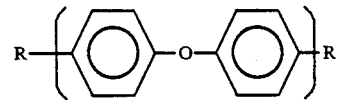

(wherein R is a straight-chain alkyl group which is bonded to an aromatic group as shown below

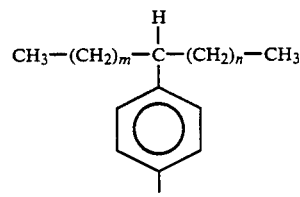

m+n of the alkyl group represents an integer between 9 and 15)

Poly-α-olefin oils used in the present invention are obtained by adding hydrogen atoms to the terminal double bonds of an α-olefin in the form of a low polymer and those expressed by the following formulas (I), (II), (III) and (IV) are some examples.

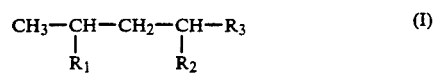

(wherein R1, R2, R3=Cn H2n+1 (n represents an integer between 6 and 14))

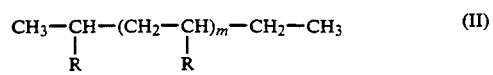

(wherein m represents one of integers 1–6; R=$C_nH_{2n+1}$ (n represents an integer between 6 and 14))

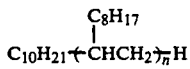
(III)

(wherein n represents one of integers 1-6)

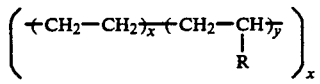
(IV)

(wherein x and y represent one of integers 1-3; z represents one of integers 3-30; $R=C_nH_{2n+1}$ (n represents one of integers 1-8))

The base oil of this invention contains an alkyldiphenylether oil and a poly-α-olefin oil in the weight ratio of between 20:80 and 80:20. If the ratio of poly-α-olefin oil in the base oil is below the above lower limit, the low-temperature performance will be insufficient. If higher than the above range, the heat resistance will be insufficient. Also, in order to minimize the amount of hydrogen that may be produced by the decomposition of grease, the ratio of alkyldiphenylether oil to poly-α-olefin oil should preferably be 50:50 or higher.

An aromatic diurea compound used in this invention as a thickening agent is a compound having in each molecule two urea bonds (—NHCONH—) and expressed by the following formula. In the process of producing the grease, it is obtained by blending a monoamine and an aromatic diisocyanate in the base oil as a solvent so that they may separate out finely in the base oil.

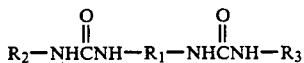

(wherein R1 designates an aromatic hydrocarbon group whose carbon number is 7-13; R2 and R3 represent an aromatic hydrocarbon group or an alkyl group whose carbon number is 8-20 and at least one of R2 and R3 represent an aromatic hydrocarbon group.)

An aromatic urea-urethane compound used in this invention as another thickening agent is a compound having in the molecules both urea bonds (—NHCONH—) and urethane bonds (—NHCOO—) and expressed by the following formula. It is obtained by reacting isocyanate with alcohol and amine in toluene or base oil as a solvent so that it will separate out finely in the toluene or base oil.

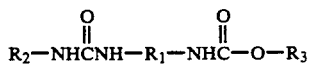

(wherein R1 designates an aromatic hydrocarbon group whose carbon number is 7-13; R2 and R3 represent an aromatic hydrocarbon group or an alkyl group whose carbon number is 8-20 and at least one of R2 and R3 is an aromatic hydrocarbon group.)

The aromatic diurea compound and/or the aromatic urea-urethane compound should be added in the amount of 5-40% by weight with respect to the base oil. This is because a grease obtained by adding less than 5% by weight of aromatic diurea compound or aromatic urea-urethane compound would turn into a liquid state having an insufficient viscosity. If more than 40% by weight, the grease would turn undesirably into a solid state.

A passivation oxidizing agent used in this invention is an oxidizing agent which serves to passivate the surface of a metal such as steel forming a rolling contact bearing. A cathode-depolarizing type inorganic anticorrosive, such as nitrites, nitrates, chromates, phosphates, molybdates or tungstates may be used.

An organic sulfonate used in this invention is a compound expressed by the general formula $RSO_3M$ and is an oil-soluble surfactant type compound having in the molecules an organic sulfonic acid ($RSO_3$) having polar groups ($SO_3^{2-}$) and a lipophilic group (R),M comprising an alkaline earth metal such as Ba, Zn or Ca, or a metal such as Pb, Na or Li, or an amine. The organic sulfonic acid may be petroleum sulfonic acid, alkylbenzenesulfonic acid, dinonylnaphthalenesulfonic acid.

In order to increase wear resistance of the grease composition according to this invention, 0.1-5% by weight of an extreme-pressure additive such as zinc dithiophosphate should be added.

It is considered that the rolling surface of a bearing used under high-speed and high-load conditions is constantly subjected to mirror wear by the vibration during rotation and the rolling elements that roll at high speed on and in frictional contact with the rolling surface.

A new surface that has been created by the wear acts as a catalyst, causing chemical decomposition of the grease. As the grease is decomposed, a large amount of hydrogen is produced in the area where the new surface is formed.

Such hydrogen can penetrate into the steel and diffuse to portions where tensile stresses concentrate. Deep inside the metal surface where stresses concentrate, high pressure produces due to the formation of hydrogen molecules, thus causing cracks which can lead to the destruction of the bearing.

Now referring to FIG. 2, we shall describe how the bearing according to this invention prevents hydrogen embrittlement.

The surface of a substrate 4 of the rolling contact bearing is coated with a passivated film 5 which is a metallic oxide formed by a passavation oxidizing agent. Sulfonic groups 6a of an organic sulfonate 6 are strongly adsorbed to this film in a single molecular layer. This is because the passivated film 5 has a polarized structure and thus is likely to interact with the sulphonic groups 6a having a polarity. The organic sulfonate 6 is orientated such that its lipophilic groups 6b face outwards. Thus, an oil film 7 of the base oil is stably formed outside the lipophic groups 6b.

With this arrangement, when the rolling elements (not shown in FIG. 2) come into frictional contact with the surface of the substrate 4, even if the oil film 7 is removed, a surface 8 is still covered by the passivated film 5. Further, even if the passivated film 5 is peeled off so that the new surface 8 is exposed, the alkyldiphenylether oil contained in the base oil serves to keep the production of hydrogen to a minimum because of its physical properties. More specifically, an alkyldiphenylether oil has a higher bond dissociation energy of C—H, C—C and C—O than an ester and thus is difficult to be decomposed.

Further, it is considered that the organic sulfonate 6 provided on the passivated film 5 serves to quickly repair any broken parts of the oil film 7. This inhibits hydrogen embrittlement still further.

The grease-sealed rolling bearing according to this invention is kept free of flaking on the rolling surface due to hydrogen embrittlement even under high-speed and high-load operating conditions and thus is durable. Further it has a high corrosion resistance, which also serves to prolong its life. The bearing according to the present invention is especially suited for use in an alternator.

Other features and objects of the present invention will become apparent from the following description made with reference to the accompanying drawings, in which.

EXAMPLES 1 AND 2

An alkyldiphenylether oil and a poly-α-olefin oil were mixed together in the ratios shown in Table 1 to form base oils. One mol of 4, 4'-diphenylmethanediisocyanate was dissolved in a first half portion of each base oil and 2 mols of monoamine (paratoluidine) was dissolved in the second half portion of each base oil. Then, the second half portion was added to the first half portion while stirring the mixture. The mixture was stirred for 30 minutes at 100°-120° C. to perfect the reaction. And then 0.5% by weight of phenothiazine as an oxidizing agent was added to the mixture, which was stirred for 10 minutes at 100°-120° C. After cooling, 1% by weight of zinc sulfonate, 1% by weight of polyhydric alcohol ester and 0.5% by weight of sodium nitrite were added to the mixture and stirred further. The mixture was then homogenized by use of a three-roll mill to obtain a proper consistency. The consistency, dropping point and friction coefficient were measured for each grease thus obtained. Also, the durability of each grease was tested by actually operating a bearing having the grease sealed therein and mounted on an alternator. Further, they were subjected to rusting tests. The test results are shown in Table 1.

Consistency: measured under JIS K2220 5.3

Dropping Point: The temperature (°C.) at which the grease melts and begins to drop by gravity was measured according to the grease dropping point testing method under JIS K 2220 5.4.

Figure 3:
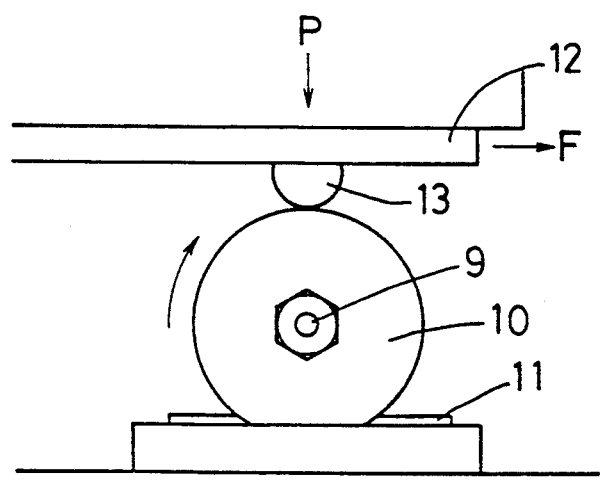
FIG. 3 is a view showing schematically a measuring device for measuring friction coefficients.

Friction Coefficient: As shown in FIG. 3, a felt 11 having each sample grease applied thereto was mounted to bring it into frictional contact with the lower part of a ring 10 (40 mm in diameter, 4 mm in thickness, SUJ2) fixed to a motor shaft 9 and the ring 10 was rotated at the speed of 1000 rpm while keeping a ball 13 (6.35 mm in diameter, SUJ2) which is fixed to a plate 12 pressed against the top end of the ring 10. The force F generated due to friction was measured under the following conditions and the friction coefficient was calculated from the force F.

Measurement time: The measurement was made 5 minutes after starting rotation; Load: 1.2 kgf; Temperature: room temperature Rusting test: The test was conducted under harsher conditions than the rusting test under ASTM D 1743. In the test, 1.6–1.9 grams of each sample grease was sealed in a bearing 6302 and a rubber seal was put on the bearing. The bearing was first put to a running-in operation at the speed of 1800 rpm for one minute with the axial load of 39.2N applied thereto. Then, after injecting 0.5 ml of 3% salt water into the bearing, it was rotated for another three minutes at 1800 rpm with the axial load at 39.2N. The bearing was put in a desiccator and left therein for 100 hours at 40° C. Then, the bearing inner race was divided circumferentially into 22 equal sections and the bearing outer race was done into 30 equal sections. The number of sections in which rust was observed was counted. This test was conducted four times and the average of the numbers in the four tests is shown in the Table as a rusting score.

Figure 1:
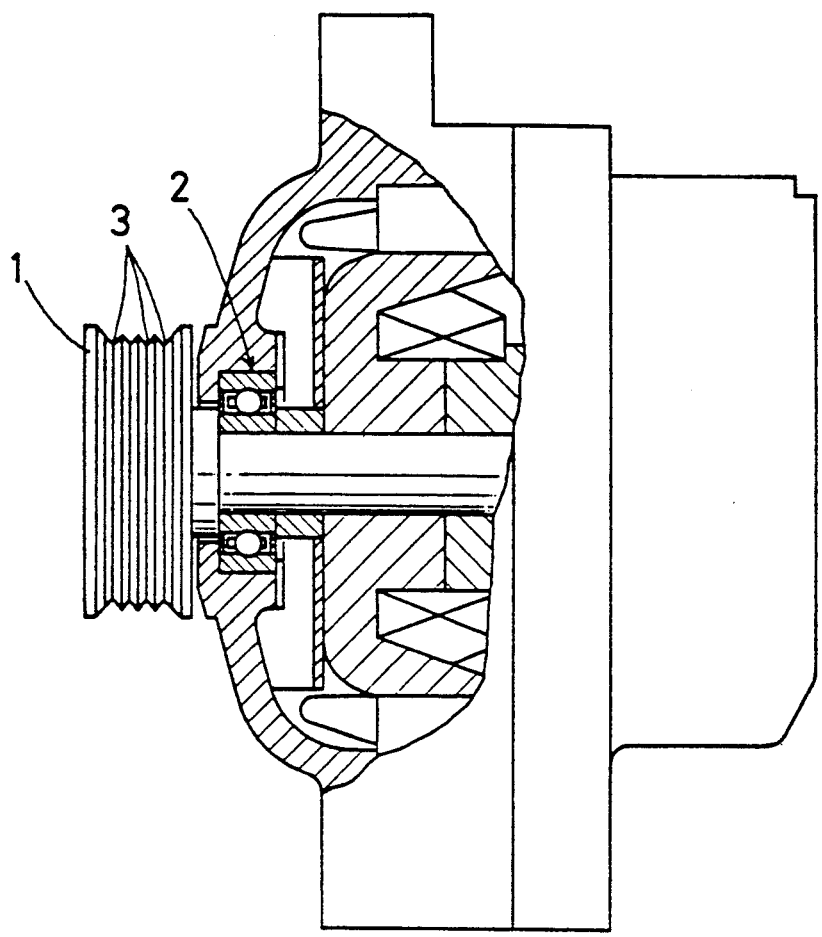
FIG. 1 is a partially cutaway vertical sectional view of an alternator and its bearing.
Figure 2:
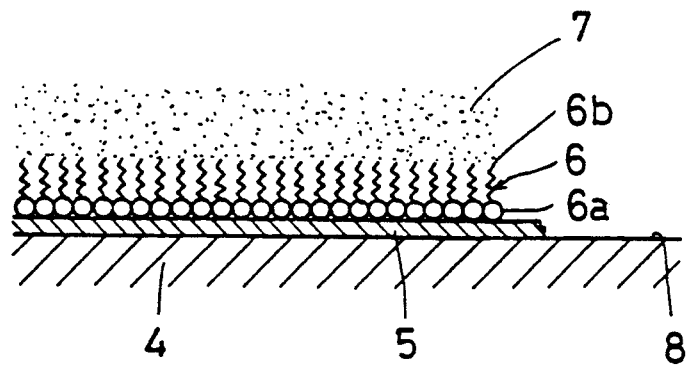
FIG. 2 is a diagrammatic view showing the mechanism with which hydrogen embrittlement on the surface of the bearing substrate is prevented.

Durability test conducted on an actual alternator: Each grease sample was sealed in the rolling bearing 2 mounted near the pulley 1 of the alternator shown in FIG. 1 and the life test was conducted n times. The bearing was rotated at the speed of 18,000 rpm with the load on the pulley 1 set at 330 kg. The elapsed time (referred to as flaking time) was measured until the vibration of the bearing measured by a vibration detector exceeds a predetermined value due to flaking and the generator eventually stops. The average of such flaking times in the n-time tests is shown in the Table as a life determined by flaking. Also, the elapsed time (referred to as seizure time) was measured until the turning torque of the bearing increases excessively due to deterioration of the grease in the bearing so that the current flowing into the motor driving the alternator exceeds a limiting value. The average of the seizure times in the n-time tests is shown in the table as a bearing life determined by seizure.

Also, in order to examine the relation between the content of base oil and the friction coefficient, we conducted the following experiment. Namely, an alkyldiphenylether and a poly-α-olefin oil were mixed together in the ratio shown in Table 2 and the friction coefficient of this mixture was measured by use of the device shown in FIG. 3 under exactly the same conditions as with the aforementioned measurement. The results are shown in Table 2.

EXAMPLE 3

A grease composition was prepared in exactly the same way as Example 1 except that 1% by weight of zinc dithiophosphate was added as an extreme-pressure additive.

EXAMPLE 4

An alkyldiphenylether oil and a poly-α-olefin oil were mixed together in the ratios shown in Table 1 to form base oils. 1 mol of 4,4'-diphenylmethanediisocyanate was dissolved in a first half portion of each base oil and 2 mols of monoamine (paratoluidine) was dissolved in the second half portion of each base oil. Then, the second half portion was added to the first half portion while stirring the mixture. The mixture was stirred for 30 minutes at 100°-120° C. to react the components to add an aromatic diurea compound in the base oil. 0.5% by weight phenothiazine as an oxidizing agent was added to this mixture, which was stirred for 10 minutes at 100°-120° C. After cooling, 3% by weight of barium sulfonate was added to the mixture and stirred further. The mixture was then homogenized by use of a three-roll mill to obtain a grease composition. The grease thus obtained and the rolling bearing having the grease sealed therein were subjected to exactly the same tests as in Example 1. The results are shown in Table 1.

EXAMPLES 5 AND 6

1 mol of hydroquinone was dispersed in toluene and 2 mols of 2,4-tolylenediisocyanate was dropped. The mixture thus obtained was stirred for 60 minutes keeping the temperature at about 50° C. As a reaction catalyst, triethylamine was used. Further, 1 mol of aniline was added and the mixture was stirred for 60 minutes keeping the temperature at about 80° C. Then 1 mol of toluene solution saturated with raulylamine was added and the mixture was stirred for 180 minutes. Thus, a thickening agent in the form of an urea-urethane compound was prepared. To the thickening agent thus obtained were added the base oil shown in Table 1, which is a mixture of an alkyldiphenylether oil and a poly-α-olefin oil, and phenothiazine as an oxidizing agent. The mixture was stirred for 30 minutes. The liquid thus obtained was poured in a butt made of enamel and left overnight therein at room temperature. Then, it was put in a muffle furnace kept at 150° C. for 30 minutes for desolvation. The resulting mixture was homogenized by use of a three-roll mill to obtain a grease composition. The grease composition obtained and a rolling bearing having the grease sealed therein were subjected to exactly the same tests as in Example 1. The results are shown in Table 1.

COMPARATIVE EXAMPLE 1

As the base oil, an alkyldiphenylether oil alone was used. 1 mol of 4, 4'-diphenylmethanediisocyanate was dissolved in a first half portion (in weight %) of the base oil and 2 mols of monoamine (paratoluidine) was dissolved in the second half portion of the base oil. Then, the second half portion was added to the first half portion while stirring. The mixture was stirred for 30 minutes at 100°–120° C., to react the components to add an aromatic diurea compound in the base oil. 0.5% by weight of phenothiazine as an oxidizing agent was added to the mixture, which was stirred for 10 minutes at 100°–120° C. After cooling, 0.5% by weight of sodium nitrite was added to the mixture and homogenized by use of a three-roll mill to obtain a grease composition. The grease thus obtained and a rolling bearing having the grease sealed therein were subjected to exactly the same tests as in Example 1. The results are shown in Table 3.

COMPARATIVE EXAMPLE 2

As the base oil, a poly-α-olefine oil alone was used. 1 mol of 4, 4'-diphenylmethanediisocyanate was dissolved in a first half portion (in weight %) of the base oil and 2 mols of monoamine (cyclohexylamine) was dissolved in the second half portion of the base oil. Then, the second half portion was added to the first half portion while stirring. The mixture was stirred for 30 minutes at 100°–120° C. to react the components to add an alicyclic diurea compound in the base oil. 0.5% by weight of phenothiazine as an oxidizing agent was added to the mixture, which was stirred for 10 minutes at 100°–120° C. After cooling, the mixture was homogenized by use of a three-roll mill to obtain a grease composition. The grease thus obtained and a rolling bearing having the grease sealed therein were subjected to exactly the same tests as in Example 1. The results are shown in Table 3.

COMPARATIVE EXAMPLES 3 AND 4

Base oils comprising an alkyldiphenylether oil and a mineral oil or a polyol ester oil and a thickening agent were mixed together in the same ratios as in Comparative Example 1. The mixture thus obtained was homogenized to obtain grease compositions.

These grease compositions were sealed in rolling bearings and were subjected to the above-described rusting and actual alternator tests. The results are shown in Table 3.

As will be apparent from the test results shown in Tables 1 and 3, Comparative Examples 1 and 2, in which an alkyldiphenylether oil and poly-α-olefin oil are not mixed together as a base oil in amounts defined according to the present invention and Comparative Examples 2–4, in which no passivation oxidizing agent was used, showed poor marks at least in one of friction coefficient, rust evaluation and durability in actual alternator test. On the other hand, Examples 1–6, which comprises a predetermined base oil and a thickening agent, a passivation oxidizing agent and an organic sulfonate added to the base oil in predetermined ratios, showed satisfactory results in all the test items. As a whole, Example 3 revealed especially good results.

[TABLE 1]

| | Example No. | | | | | |
|---|---|---|---|---|---|---|
| | 1 | 2 | 3 | 4 | 5 | 6 |
| Composition of base oil (wt %) | | | | | | |
| Alkyldiphenilether oil | 80 | 50 | 80 | 20 | 80 | 20 |
| Poly-α-olefin oil | 20 | 50 | 20 | 80 | 20 | 80 |
| Viscosity at 40° C. (cSt) | 72.3 | 51.2 | 72.3 | 58 | 72.3 | 58 |
| Composition (wt %) | | | | | | |
| Base oil | 74.5 | 74.5 | 73.5 | 73.5 | 77.5 | 76.5 |
| Thickener | | | | | | |
| Aromatic diurea compound | 23 | 23 | 23 | 23 | — | — |
| Aromatic urea-urethane compound | — | — | — | — | 20 | 20 |
| Passivation oxidizing agent | A: 0.5 B: 1 | A: 0.5 B: 1 | A: 0.5 B: 1 | A: 0.5 C: 3 | A: 1 B: 1 | A: 0.5 C: 3 |
| Organic sulfonate* | C: 1 | D: 1 | D: 1 | | C: 0.5 | |
| Extreme pressure additive* | — | — | E: 1 | — | — | — |
| Consistency | 300 | 300 | 292 | 296 | 290 | 285 |
| Dropping point (°C.) | 240 | 244 | 240 | 240 | Over 300 | Over 300 |
| Friction coefficient | 0.057 | 0.065 | 0.031 | 0.067 | 0.060 | 0.065 |
| Flaking | Nil | Nil | Nil | Nil | Nil | Nil |
| Life test on alternator (Seizure life time in hours) | 887 (n = 9) | 747 (n = 3) | 900 (n = 6) | 779 (n = 9) | 850 (n = 6) | 870 (n = 6) |

[TABLE 1]-continued

|  | Example No. | | | | | |
| --- | --- | --- | --- | --- | --- | --- |
|  | 1 | 2 | 3 | 4 | 5 | 6 |
| Rust evaluation in rust test (n = 4) | 2 | 8 | 2 | 2 | 3 | 2 |

*A: Sodium nitrite
B: Zinc sulphonate
C: Barium sulphonate
D: Polyhydric alcohol ester
E: Zinc dithiophosphate

[TABLE 2]

| Alkyldiphenilether oil (Content, wt %) | 100 | 80 | 70 | 50 | 20 | 0 |
| --- | --- | --- | --- | --- | --- | --- |
| Poly-α-olefin oil (Content, wt %) | 0 | 20 | 30 | 50 | 80 | 100 |
| Friction coefficient | 0.055 | 0.048 | 0.048 | 0.041 | 0.050 | 0.061 |

[TABLE 3]

|  | Comparative Example No. | | | |
| --- | --- | --- | --- | --- |
|  | 1 | 1 | 3 | 4 |
| Composition of base oil (wt %) | | | | |
| Alkyldiphenilether oil | 100 | — | 40 | 40 |
| Poly-α-olefin oil | — | 100 | — | — |
| Mineral oil | — | — | 60 | — |
| Polyolester oil | — | — | — | 60 |
| Viscosity at 40° C. (cSt) | 103 | 47.3 | — | — |
| Composition (wt %) | | | | |
| Base oil | 76.5 | 80 | 80 | 80 |
| Thickener | | | | |
| Aromatic diurea compound | 23 | — | 20 | 20 |
| Alicyclic diurea compound | — | 20 | — | — |
| Passivation oxidizing agent* | A: 0.5 | — | — | — |
| Extreme pressure additive | — | — | — | — |
| Consistency | 303 | 250 | — | — |
| Dropping point (°C.) | Over 260 | Over 260 | — | — |
| Friction efficient | 0.077 | 0.071 | — | — |
| Life test (2) on alternator (Seizure life time in hours) n = 5 | 208 | 294 | — | — |
| Life test (1) on alternator (Flaking life time in hours) n = 5 | >1000 | 150 | 61 | 80 |
| Rust evaluation in rust test (n = 4) | 27 | 27 | 27 | 27 |

*A: Sodium nitrite

What is claimed is:

1. A grease-sealed rolling contact bearing having sealed therein a grease composition comprising a base oil which is a mixture of an alkyldiphenylether oil and a poly-α-olefin oil in the weight ratio of between 20:80 and 80:20, 5–40% by weight of a thickening agent which is at least one of an aromatic diurea compound and an aromatic urea-urethane compound, a passivation oxidizing agent and an organic sulfonate.

* * * * *